Patented Sept. 30, 1952

2,612,439

UNITED STATES PATENT OFFICE 2,612,439

DIESEL FUEL COMPOSITION

John G. McNab, Cranford, N. J., assignor to Standard Oil Development Company, a corporation of Delaware No Drawing. Application July 8, 1948, Serial No. 37,531

3 Claims. (Cl. 44—76)

This invention relates to a novel method of operating a diesel engine utilizing a fuel containing high proportions of sulfur compounds. The present invention consists of a new diesel fuel composition consisting of a diesel fuel base containing more than ½ of a percent sulfur and containing about 0.1% to 1% of a metal aroxy compound. The invention concerns the method of obtaining satisfactory diesel engine operation with a high sulfur content fuel which comprises introducing into the diesel fuel and into the lubricant used with the diesel engine, a small amount of a metal aroxy compound.

The present invention is concerned with the general problem of successfully utilizing a high sulfur content diesel fuel in a diesel engine. As is well known, the presence of sulfur compounds in a diesel fuel markedly contributes to the wear of the engine and to the engine deposits which form. A particular manner in which this difficulty may be manifested is the frequency and severity with which piston rings stick in a diesel engine utilizing a high sulfur fuel. In this connection, reference may be made to the Journal of the Society of Automotive Engineers, vol. 51, November 1943, pages 408 to 414 and pages 419 to 420. The article at this portion of the publication, entitled "Influence of diesel fuel properties on engine deposits and wear," states in part that sulfur compounds in the fuel materially add to the engine deposits and wear of the engine encountered.

Because of the recognized difficulty or even impossibility of successfully operating a diesel engine with high sulfur fuels, present fuel specifications often limit the amount of sulfur which may be present in the fuel to either 0.5% or 1% maximum. Thus, the usual civilian commercial specifications for a diesel fuel normally permit no more than 0.5% sulfur. Navy diesel fuel specifications permit a maximum sulfur content of 1%.

While it has been recognized that high sulfur diesel fuels are generally unsatisfactory for diesel engine operation, nevertheless attempts have been made to modify the fuel or the method of operating the engine so as to permit using high sulfur fuels outside the limits ordinarily considered to be maximum. There are two reasons for desiring to successfully utilize high sulfur diesel fuels. First, it is known that sulfur compounds tend to increase the cetane number of diesel fuels, that is, to shorten the delay of ignition under the heat of compression developed in a cylinder. Secondly, it is clearly of considerable commercial value to be able to utilize high sulfur crude oils for the preparation of diesel fuels having relatively high sulfur concentrations. This factor is becoming of increased importance as the introduction of high sulfur middle east crudes is becoming more extensive.

It has been found possible to successfully operate a diesel engine with a high sulfur fuel by using what may be said to be a super lubricating oil in the engine while burning high sulfur fuel. Thus it is possible to add sufficient additives to a lubricating oil so that an engine employing this lubricating oil may be successfully operated with a high sulfur content diesel fuel. It is apparent that this method of solving the problem of utilizing a high sulfur fuel is not attractive. At the present time high sulfur content fuels probably do not exceed 10% of the total diesel fuel production. Consequently the necessity for generally adopting a superlubricating oil as indicated would unnecessarily increase the expense of diesel engine operation when utilizing at least 90% of the presently available diesel fuels. Alternatively, it would be necessary to adopt the cumbersome procedure of employing the special super lubricating oil on each occasion that a high sulfur diesel fuel is utilized in an engine. Consequently it is clear that a preferred manner of solving the problem of successfully utilizing a high sulfur diesel fuel is to successfully treat the fuel itself rather than to treat the lubricating oil to be used with the fuel.

It is therefore a particular object of this invention to provide a method of operating a diesel engine whereby conventional heavy duty lubricating oils can be successfully used with high sulfur content diesel fuel. It is a further object of this invention to permit utilization of high sulfur diesel fuel by simply incorporating in the fuel a small quantity of particular additives.

In accordance with this invention, certain metal derivatives of organic compounds have been found to be entirely effective for accomplishing the object of permitting successful engine operation with a high sulfur content diesel fuel. In one embodiment of this invention the metal derivatives of organic compounds are added only to the diesel fuel itself while in another embodiment of this invention, the said organic compounds are added to both the diesel fuel and to the lubricating oil used with this particular fuel.

The preferred metal derivatives used in the present invention comprise metal salts of aromatic hydroxy compounds, particularly those salts which contain a metal constituent linked to an aromatic nucleus through oxygen. Analogous compounds suitable for use in the present invention are those in which the metal constituent is attached to the aromatic nucleus through some other negative radical or negative atom, such as sulfur. Also, in general, it is preferred to have the aromatic nucleus or aryl radical in the compound contain one or more alkyl side chain substituents, e. g., propyl, isopropyl, butyl, isobutyl, tertiary butyl, amyl, isoamyl, di-isobutyl (iso-octyl) cetyl, octadecyl, or analogous aliphatic radicals in order to obtain the desired degree of solubility in the diesel fuel being employed.

A particularly preferred group of metal salts belonging to the class above described comprises salts of hydroxy-aromatic sulfides which may be represented by the following type formula:

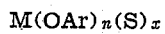
$$M(OAr)_n(S)_x$$

wherein Ar represents aliphatic substituted aromatic nuclei, M is the metal constituent linked thereto through oxygen, $n$ is an integer corresponding to the valence of the metal M, and $x$ is an integer, 1 to 4, and preferably 1 or 2. Analogous compounds have the type formula $M(ZAr)(S)_x$, wherein Z represents, generically, a negative radical or atom.

The characteristic formula may have a number of modifications, for example, the aromatic radical may be mono- or poly-cyclic; the number, kind, and position of alkyl substituents in any of the aromatic nuclei may be varied; also, other substituent groups, e. g., amino groups, alkoxy groups, or elements such as halogen or phosphorus may be introduced either in the aromatic ring or the alkyl side chains.

Examples of phenol sulfide compounds which may be employed in accordance with the present invention include barium di-isobutyl phenol sulfide (barium iso-octyl phenol sulfide), barium di-isobutyl phenol disulfide, calcium di-tertiary amyl phenol sulfide, cobalt hexyl phenol sulfide, magnesium cetyl phenol disulfide, and barium octadecyl cresol sulfide. Metal phenolate salts which may be used include calcium di-isobutyl phenolate, barium salts of petroleum phenols, magnesium ter-amyl phenolate, barium salt of cashew nut shell phenol (cardanol), calcium cetyl phenolate, and calcium octadecyl phenolate.

Instead of the metal salts of aromatic sulfides and metal phenolates described above, one may use metal derivatives of other hydroxy compounds, such as alcoholates, enolates, salicylates, and the like. All of these above-described compounds can be classed generically under the general formula MXY, in which M represents a metal, X represents oxygen or a member of the sulfur family, and Y represents an organic radical such as aryl or alkyl or corresponding thio-ethers, di-sulfide, and other derivatives thereof as explained above. In all of these compounds the metal is attached through the element to a carbon atom in the organic radical Y, which latter carbon atom in turn is connected only to carbon or hydrogen.

Although the present invention is primarily concerned with addition agents of the general formula MXY, as described above, other metal compounds may be used such as metal derivatives of organic-substituted inorganic acids, such as phosphoric and phosphorous acids and thio derivatives, as well as sulfonates. For instance, calcium octadecyl phosphate or barium octyl mono-thiophosphite may be used as well as the calcium or barium salt of a di-substituted thiophosphoric acid, prepared by reacting cetyl phenol with $P_2S_5$. Examples of sulfonates include the calcium salt of oil-soluble mahogany sulfonic acids, derived by treating a petroleum oil fraction with fuming sulfuric acid, and calcium triisobutyl phenol sulfonate.

The phenolate compounds considered particularly useful for the present purposes may be described as being salts derived preferably from alkylated phenols, such as are obtained from various natural sources, or synthetically by reacting phenol with an alkylating agent, such as an olefin. Suitable phenols, then, include petroleum phenols and phenolic materials from cashew nut shells or other vegetable sources, as well as phenol, cresol, naphthol, etc. which has been alkylated with olefins or alcohols of sufficient molecular weight to impart adequate solubility to the finished metal salts. Also, preferably, the alkyl phenols contain a negative substituent group, such as sulfur, in a thioether linkage or disulfide linkage. These are readily obtained by reacting an alkylated phenol compound with sulfur mono-chloride, sulfur dichloride, or a mixture of the two chlorides.

A particularluy useful additive can thus be prepared by alkylating phenol with di-isobutylene (the dimer of isobutylene) under suitable conditions to give di-isobutyl phenol (also called iso-octyl phenol or tetramethyl butyl phenol). This alkylated phenol is then caused to react with sulfur monochloride or dichloride to form the di-isobutyl phenol monosulfide or disulfide which is then converted to the desired metal salt by reaction with a metal oxide or hydroxide. An advantageous method of preparation of these additives is described in U. S. Patent 2,294,145 of Winning, Van Voorhies, and McNab. The desired alkylated phenol or phenol sulfide is added to a vehicle such as a mineral oil and then neutralized with a suitable basic acting metal compound, preferably in the presence of a small amount of a higher alcohol such as stearyl alcohol which acts as a foam-suppressing agent and is finally filtered. The product is a concentrate of the desired additive in mineral oil. This concentrate may be advantageously used in the present invention as a convenient means of introducing the additive into the diesel fuel. In addition, the presence of a small amount of lubricating oil in the fuel will prevent the separation of normally solid metal derivatives in manifolds or other parts of the engine when the fuel is vaporized.

The metal to be substituted for hydrogen in the hydroxyl group of the phenols for obtaining the desired agents may be selected from metals of the alkali metal group, alkaline earth metal group, aluminum, chromium, tin, iron, nickel, cobalt, and related metals, but the preferred metal is one of the alkaline earth metal groups which forms a soft, substantially non-abrasive ash on burning, e. g., barium, calcium, magnesium, etc., barium being especially preferred.

Metallic additives especially preferred for this invention are barium di-isobutyl phenol sulfide, calcium petroleum sulfonate, barium di-isobutyl phenol disulfide, and calcium octadecyl phenolate.

Very small amounts of the effective metal derivatives are sufficient to realize a substantial improvement in the diesel engine condition. These agents may be used in a proportion of from about 0.01% to 1.0% by weight of the diesel fuel oil for a substantial improvement, even though these compounds have little or on. effect on the ignition quality or other properties of the fuel.

The above-described metal derivatives may be used in conjunction with other additives which are capable of enhancing their effectiveness. High molecular weight aliphatic alcohols, such as stearyl alcohol, are particularly useful in this respect. Also, phenolic ethers, such as the tertiary butyl ether of ortho tertiary butyl p-cresol, may be similarly employed.

Although it is not intended that the invention be limited thereby, the following example is given to illustrate the distinctively beneficial results obtained in applying the present invention to the operation of a full scale single cylinder Caterpillar diesel engine under normal operating conditions for a run of 240 hours.

EXAMPLE

As indicated, a single cylinder Caterpillar test engine was operated in a series of 240 hour tests to evaluate the results obtainable by the application of this invention. In operating this engine a diesel fuel was used which consisted of a straight run distillate combining in equal proportions distillate from West Texas and Florida crude oils. The API gravity of this fuel was 35.2. The cetane number was 50. The sulfur content was 1.1%. The fuel had an initial boiling point of 360° F. and a final boiling point of 630° F. The lubricant employed was an extracted Mid-Continent base stock SAE 30 containing the additives shown in the table. Shown in the table are the results of the tests made.

the table containing 4.4 volume per cent of inhibitor B was a lubricating oil which may be classed as a good quality heavy duty lubricant. This oil is one which passes the U. S. Army Specification 2-104B. This specification is presently employed to evaluate so called heavy duty detergent type lubricating oils and the specification includes an approval test in a Caterpillar diesel engine. Lubricants passing U. S. Army Specification 2-104B are lubricants which are satisfactory for diesel engine operation utilizing a low sulfur content diesel fuel, that is, below about 0.5%.

It will be noted, therefore, from the table that the lubricant shown in column 4, comprising a satisfactory type of heavy duty lubricant, was not sufficiently good for the test shown utilizing a fuel containing 1.1% sulfur. Thus the overall engine demerit was 3.2 indicating poor engine condition and it was found that one piston ring stuck during the operation, being bound over 120° of the circumference of the piston. This verifies the statement formerly made that a high sulfur content fuel can not be successfully used in a diesel engine utilizing conventional high quality lubricating oils. While not shown in the table, it may be noted that engine operation employing the specified lubricating oil without any additives whatever would be impossible due to severe piston ring sticking.

*Table*

RESULTS OF 240 HOUR TESTS IN CATERPILLAR ENGINE USING DIESEL FUEL CONTAINING 1.1% SULFUR

| Additive in Lubricant | Inhibitor A | | Inhibitor B | | |
|---|---|---|---|---|---|
| Vol. Percent Additive in Lube. | 8.8 | 13.5 | 8.8 | 4.4 | 4.4 |
| Additive in Fuel | none | none | none | none | 0.04 Inhibitor C. |
| Engine Demerits: | | | | | |
| Overall | 3.84 | 0.86 | 2.12 | 3.23 | 2.53 |
| Piston Varnish | 0.21 | 0 | 0 | 1.25 | 0.10 |
| Piston Ring-Zone | 4.92 | 0.66 | 2.3 | 3.96 | 3.12 |
| Piston Ring stuck | one, 360° | none | none | one, 120° | none |

Inhibitor A shown in the above table consisted of a mineral oil concentrate consisting of about 40 weight per cent barium di-isobutyl phenol sulfide and 60% of mineral oil. Inhibitor B consisted of 37.5 volume per cent of a mineral oil concentrate of calcium petroleum sulfonate (about 30 weight per cent active ingredient) and 62.5 volume per cent of a mineral oil concentrate of barium di-isobutyl phenol sulfide which had been treated with phosphorous pentasulfide (about 40 weight per cent active ingredient). Inhibitor C consisted of 71 weight per cent barium di-isobutyl phenol sulfide and 29 weight per cent calcium petroleum sulfonate added as a mineral oil concentrate containing about 40 weight per cent active ingredients.

The indicated engine demerits shown in the table were obtained by inspecting each of the engine parts after the indicated run. The individual demerit ratings were weighted according to their relative importance and an overall rating calculated therefrom. In the engine demerit scale adopted, a rating of 0 to 10 was used, 0 representing the best (no deposits) and 10 the worst condition which could conceivably be obtained. On this scale an overall engine demerit of one or less indicates excellent engine condition, while a rating of 2 to 3 is a good engine condition, while above 3 is a very poor engine condition.

The lubricating oil indicated in column 4 of

It will be noted that successful engine operation was possible when using two and three times the quantity of inhibitor B in the specified lubricating oil. At the same time, it must be recalled as formerly stated, that utilization of such high quantities of additives would not be commercially attractive.

Indicated in the last column of the table is a test run in accordance with the teachings of this invention. In this test 4.4 volume per cent of inhibitor B was used in lubricating oil and 0.04 weight per cent (as active ingredient) of inhibitor C was employed in the diesel fuel containing 1.1% sulfur. At the end of the 240 hour test the overall engine demerit was found to be 2.5% indicating good engine condition. Furthermore, the test was successfully completed without any sticking of the piston rings. It may be noted that the oil consumption in the test indicated in the last column, was only 0.7 lb. of oil over the 240 hour test period. This oil consumption compares to a 3 to 4 lb. consumption conventionally encountered over the indicated test period.

As indicated by the data of the table, therefore, satisfactory diesel engine operation is possible utilizing high sulfur content fuels containing suitable proportions of the organic compounds disclosed. Diesel fuels which may be utilized by the practice of this invention therefore comprise diesel fuels containing a higher sulfur content than most present specifications permit. Thus, the diesel fuel may have greater than ½% sulfur or referring to the Navy specifications, the fuel may contain greater than 1% sulfur content. It is particularly contemplated that this invention is applicable to diesel fuels containing from ½% to 3% sulfur. It is to be understood that the optimum proportions of organic compounds to be incorporated will vary somewhat depending upon the particular concentration of sulfur. In general, from 0.01% to 1% of the inhibitors of this invention are to be used. As indicated, in accordance with this invention, further improvements in engine cleanliness can be effected by employing additives of the types herein described in both the diesel fuel and in the crankcase lubricants. This is particularly advantageous when the diesel engine is to operate under severe heavy duty service.

The agents of this invention may be used incorporated in the fuel or may be supplied to the engine separately during operation particularly when needed as when the engine is running under heavy load.

The metallic derivatives of this invention may also be used in conjunction with other diesel fuel additives such as anti-oxidants, ignition promoters, dyes, etc.

Having now fully described this invention, what is claimed is:

1. A diesel fuel consisting essentially of a hydrocarbon diesel fuel base stock having greater than 0.5% sulfur and containing about 0.01% to 1% of a mixture of calcium petroleum sulfonate and an alkaline earth metal salt of an alkylated phenol sulfide in which the said alkaline earth metal salt is selected from the group consisting of calcium, barium, and magnesium, and in which the said alkyl group contains from 8 to 18 carbon atoms.

2. A diesel fuel containing a major proportion of a hydrocarbon diesel fuel base stock having greater than 0.5% sulfur and about 0.01% to 1% of a mixture of barium di-isobutyl-phenol sulfide and calcium petroleum sulfonate.

3. The composition defined by claim 2 in which the said mixture comprises about 70 weight per cent barium di-isobutyl phenol sulfide and 30 weight per cent of calcium petroleum sulfonate.

JOHN G. McNAB.

REFERENCES CITED

The following references are of record in the file of this patent:

UNITED STATES PATENTS

| Number | Name | Date |
|---|---|---|
| 2,289,795 | McNab | July 14, 1942 |
| 2,372,411 | VanEss | Mar. 27, 1945 |
| 2,385,158 | Paulsen | Sept. 18, 1945 |
| 2,418,894 | McNab | Apr. 15, 1947 |